United States Patent
Elstorpff et al.

(10) Patent No.: US 8,770,354 B2
(45) Date of Patent: *Jul. 8, 2014

(54) PNEUMATIC BRAKE CYLINDER

(75) Inventors: Marc-Gregory Elstorpff, München (DE); Christian Ebner, Augsburg (DE); Michael Mathieu, Puchheim (DE); Erich Fuderer, Fürstenfeldbruck (DE)

(73) Assignee: Knorr-Bremse Systeme fur Schienenfahrzeuge Gmbh, Munich (DE)

(*) Notice: Subject to any disclaimer, the term of this patent is extended or adjusted under 35 U.S.C. 154(b) by 268 days.

This patent is subject to a terminal disclaimer.

(21) Appl. No.: 13/124,152
(22) PCT Filed: Oct. 7, 2009
(86) PCT No.: PCT/EP2009/007186
§ 371 (c)(1), (2), (4) Date: May 3, 2011
(87) PCT Pub. No.: WO2010/043326
PCT Pub. Date: Apr. 22, 2010

(65) Prior Publication Data
US 2011/0198166 A1 Aug. 18, 2011

(30) Foreign Application Priority Data
Oct. 15, 2008 (DE) .................. 10 2008 051 679

(51) Int. Cl.
*F16D 65/56* (2006.01)
*F16D 65/28* (2006.01)
*B60T 17/08* (2006.01)
*B61H 15/00* (2006.01)
*F16D 121/02* (2012.01)

(52) U.S. Cl.
CPC .............. *B60T 17/081* (2013.01); *F16D 65/28* (2013.01); *F16D 65/56* (2013.01); *B61H 15/0028* (2013.01); *F16D 2121/02* (2013.01)
USPC ..................... 188/202; 188/71.9; 188/196 V

(58) Field of Classification Search
USPC ........... 188/198, 202, 71.7, 71.8, 71.9, 196 V, 188/196 P; 92/13, 13.8, 129, 136, 140
See application file for complete search history.

(56) References Cited

U.S. PATENT DOCUMENTS 3,043,406 A * 7/1962 Larsson .................... 188/196 R
3,100,032 A * 8/1963 Larsson .................... 188/196 D
(Continued)

FOREIGN PATENT DOCUMENTS

DE     2 040 116     2/1971
DE     1 000 245     1/1995
(Continued)

OTHER PUBLICATIONS

English-language Abstract of JP 57-209454.*
(Continued)

*Primary Examiner* — Bradley King
*Assistant Examiner* — Nicholas J Lane
(74) *Attorney, Agent, or Firm* — Barnes & Thornburg LLP

(57) ABSTRACT

The invention relates to a pneumatic brake cylinder including a housing, a piston that can be moved in the housing and is used to transfer the pneumatic pressure to a brake, and a device for automatic adjustment in the event of wear of the brake linings, the device including a spindle, an adjusting nut, and a piston tube that can be engaged with the adjusting nut. According to the invention, a torque applied to the piston tube by the adjusting nut is introduced by the piston tube directly into elements connected to the housing in a fixed manner.

8 Claims, 2 Drawing Sheets

(56) References Cited

U.S. PATENT DOCUMENTS

| | | | |
|---|---|---|---|
| 3,589,477 A * | 6/1971 | Sander | 188/76 |
| 3,602,343 A * | 8/1971 | Billeter | 188/202 |
| 3,899,053 A * | 8/1975 | Nadas | 188/203 |
| 4,050,554 A * | 9/1977 | Scheffel | 188/203 |
| 4,088,205 A * | 5/1978 | Frania et al. | 188/196 D |
| 4,364,305 A | 12/1982 | Dalibout et al. | |
| 4,385,548 A * | 5/1983 | Persson et al. | 92/33 |
| 4,635,762 A * | 1/1987 | Nilsson et al. | 188/203 |
| 4,793,446 A * | 12/1988 | Hart et al. | 188/52 |
| 5,423,401 A * | 6/1995 | Noah et al. | 188/203 |
| 5,492,053 A * | 2/1996 | Stonehill | 92/241 |
| 5,937,974 A * | 8/1999 | Cathcart et al. | 188/203 |
| 6,443,270 B1 * | 9/2002 | Hodge | 188/196 BA |
| 6,651,784 B1 | 11/2003 | Barbosa et al. | |
| 8,365,880 B2 * | 2/2013 | Smith et al. | 188/196 P |
| 2004/0168867 A1 | 9/2004 | Kerscher et al. | |
| 2011/0226568 A1* | 9/2011 | Elstorpff et al. | 188/151 R |
| 2011/0266102 A1* | 11/2011 | Elstorpff et al. | 188/196 V |

FOREIGN PATENT DOCUMENTS

| | | | |
|---|---|---|---|
| EP | 0 224 787 | 6/1987 | |
| GB | 1 279 706 | 6/1972 | |
| JP | 57209454 A * | 12/1982 | B60T 13/40 |

OTHER PUBLICATIONS

Transmittal of International Preliminary Report on Patentability for International Application No. PCT/EP2009/0071846 and Written Opinion.

English Translation of the International Preliminary Report on Patentability for International Application No. No. PCT/EP2009/007186 and Written Opinion.

International Search Report for International Application No. PCT/EP2009/007186, dated Jul. 21, 2010.

German Office Action of Application No. 10 2008 051 67915, Dec. 21, 2012.

* cited by examiner

PNEUMATIC BRAKE CYLINDER

CROSS-REFERENCE TO RELATED APPLICATIONS

The present application claims the benefit of priority to International Patent Application No. PCT/EP2009/007186 filed 7 Oct. 2009, which further claims the benefit of German Patent Application No. 10 2008 051 679.1 filed 15 Oct. 2008, the contents of which are incorporated herein by reference in their entirety.

FIELD OF THE INVENTION

Disclosed embodiments relate to a pneumatic brake cylinder.

BACKGROUND

Brake cylinders of this type are used, inter alia, in rail vehicles. There, they are frequently used to actuate a brake caliper, with the aid of which brake linings are pressed onto a brake disk. Here, the piston stroke is to always be approximately equally great, independently of the wear of the brake linings. For this purpose, an adjusting device is usually provided which has a spindle which is guided in a piston tube and an adjusting nut. An axial force is exerted on the spindle by a spring, which axial force attempts to pull the spindle out of the adjusting device. Since the spindle and the adjusting nut are connected to one another via a thread which is not self-locking, a torque acts on the adjusting nut as a result of the spring force.

During the normal braking operation, the adjusting nut is blocked in such a way that only a linear movement together with the spindle in the direction of the longitudinal center axis of the brake cylinder is permitted, but not a rotational movement. A rotation of the adjusting nut may only be permitted for the adjusting operation when a certain wear of the brake linings has taken place. In order to control the rotational movement of the adjusting nut during the initiation of a braking operation, what is known as a control sleeve is used which is arranged within the piston tube such that it can be displaced on the spindle. The torque is transmitted from the control sleeve to the piston tube via integrally formed locking arms which are guided in open slots of the piston tube. During the braking operation, in contrast, the torque of the adjusting nut is transmitted directly to the piston tube.

The piston tube is connected fixedly to the piston, with the result that the torque is transmitted from the piston tube to the piston. The torque is introduced into the housing via guide pins which are attached to the piston and which correspond with appropriate guides in the housing. This force transmitting connection between the piston and the piston tube leads to a complicated and expensive component which is difficult to mount. The dismantling, mounting and the components to be replaced are relatively expensive even in the case of reconditioning of the pneumatic cylinder.

In the case of another known brake cylinder, the locking arms of the control sleeve are supported on a stop ring which is screwed into the cover of the cylinder. Here, the torque which acts on the adjusting nut is transmitted via the locking arms into the housing of the brake cylinder not only in the rest position but also during the braking operation, since the piston tube is also supported on the locking arms via the open slots. The control sleeve and the integrally formed locking arms therefore have to be of very solid and stable configuration.

In the case of two previously known brake cylinders, the adjusting device cannot be premounted as one unit on account of the locking arms which are integrally formed onto the control sleeve.

SUMMARY

Disclosed embodiments are based on the concept of configuring a pneumatic brake cylinder in such a way that the costs for the components can be reduced and the mounting can be made cheaper, both during the production and during reconditioning of the brake cylinder. This is achieved by a pneumatic brake cylinder.

As a result of the fact that a torque which is applied by the adjusting nut to the piston tube is introduced by the piston tube directly into elements which are connected fixedly to the housing, no particularly solid control sleeve has to be used. Furthermore, a stop ring which is screwed into the cover of the housing is neither necessary, nor are guide pins needed which are attached to the piston and correspond with appropriate guides in the housing. The adjusting device can be premounted as one unit, since a control sleeve without locking arms can be used.

BRIEF DESCRIPTION OF THE FIGURES

Further details and advantages of the disclosed embodiments result from the description of one exemplary embodiment which will be explained in detail using the drawing, in which.

DETAILED DESCRIPTION

Figure 1:
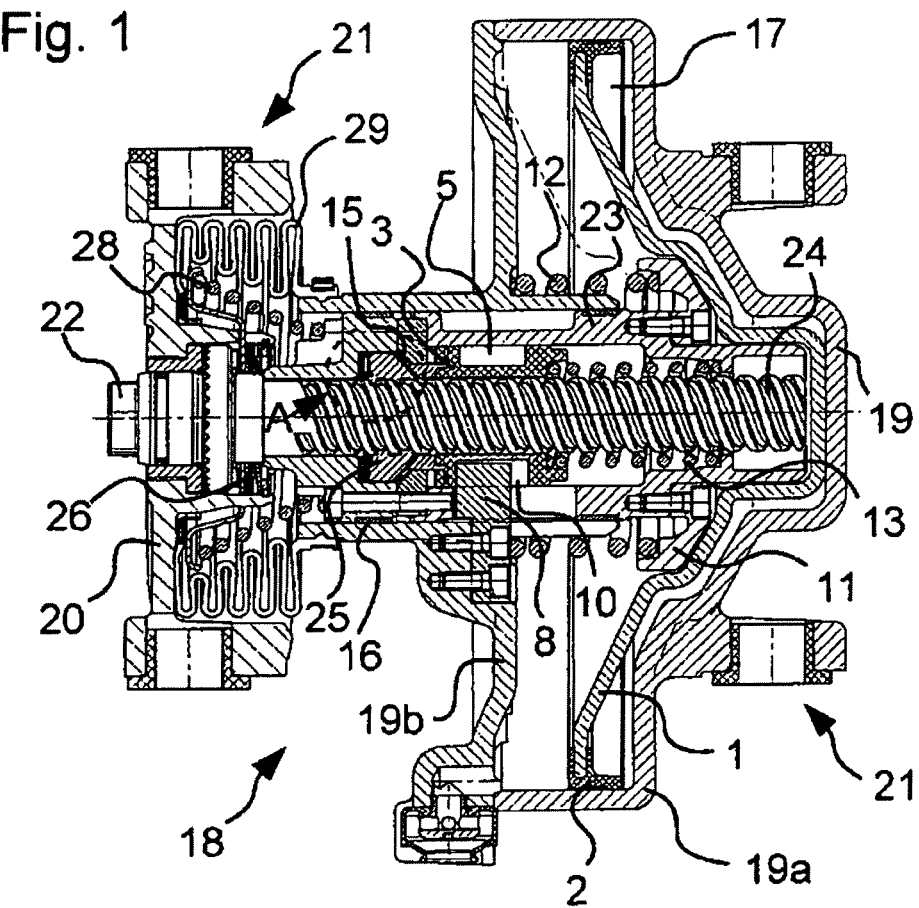
FIG. 1 shows a section through a pneumatic brake cylinder according to the invention.

The elements which are connected fixedly to the housing are advantageously configured as sliding blocks. It is normally sufficient to provide two sliding blocks of this type and to screw them fixedly to the housing. This connection ensures a reliable introduction of the torque from the piston tube directly into the housing during the braking operation.

Since the piston tube has to be mounted such that it can be displaced axially in the housing, the connection between the sliding blocks which are connected fixedly to the housing and the piston tube also has to be of corresponding design. For this purpose, the sliding blocks slide in slots of the piston tube. In the case of the use of the control sleeve which is known from the prior art with the integrally formed locking arms, via which the torque was transmitted from the piston tube into the housing, open slots were necessary in the piston tube, in order for it to be possible to mount the control sleeve at all. The upwardly and downwardly closed slots which are then possible ensure substantially higher stability and security against deformation.

In order to transmit the torque from the piston tube into the housing, the piston and guide pins which are attached to it no longer have to be used. A connection between the piston and the piston tube can therefore be dispensed with completely.

The piston is therefore inserted loosely into the cylinder and has no fixed connection to the piston tube.

Since, according to the invention, the torque is transmitted directly from the piston tube to the sliding blocks which are screwed to the housing, no torque has to be transmitted via the piston. As a result, the forces to be absorbed by the piston are restricted to compressive forces in the axial direction. The piston can therefore be produced as an inexpensive deep drawn part. The required stability is achieved by a deep drawn part made from steel.

A sealing ring is advantageously vulcanized onto the edge of the piston. In contrast to a sealing ring which is fastened on the piston with the aid of a vulcanized steel ring, the mounting is simplified considerably both during the production of the brake cylinder and during the reconditioning of the brake cylinder, as a result of which the mounting costs can be reduced. The complete piston can be replaced in a simple way during the reconditioning of the brake cylinder.

The adjusting nut advantageously has an oblique external toothing system on one end side. This ensures a large engagement area. The oblique position of the external toothing systems also brings about a centering action at the same time.

During the braking operation, the torque which acts on the adjusting nut has to be introduced into the piston tube. For this purpose, the piston tube has a piston tube toothing system which can be brought into engagement with the external toothing system of the adjusting nut. The piston tube toothing system is configured as an oblique internal toothing system, with the result that the piston tube toothing system can engage completely into the toothing system of the adjusting nut.

A control sleeve is also provided in the piston tube. The torque which acts on the adjusting nut is also to be introduced into the housing via the control sleeve in the case of the initiation of the braking operation.

For this purpose, the sliding blocks engage with their free end into sliding channels of the control sleeve. In this way, no integrally formed locking arms are necessary. The sliding blocks achieve the object of introducing both the torque of the piston tube and the torque of the control sleeve into the housing. To this end, they protrude through the slots which are provided in the piston tube and in this way are connected at the same time to the piston tube and the control sleeve.

The sliding channels of the control sleeve are dimensioned in such a way that they act as a stop for the sliding blocks and restrict an axial movement of the control sleeve. Here, the permitted sliding path of the control sleeve corresponds to the spacing of the brake linings from the brake disk plus the elastic deformation of the parts which transmit the braking force between the brake cylinder and the brake linings.

The control sleeve is advantageously produced as a composite part with a sliding sleeve made from plastic and an injection molded coupling ring made from metal. The sliding channels are provided in the sliding sleeve. The use of plastic is sufficient for stability reasons, since no locking arms which have to transmit the torque from the piston tube to the housing are integrally formed on the control sleeve. The production costs for the control sleeve can therefore be reduced in comparison with the previously usual continuous casting. The metallic coupling ring can be configured, for example, as an extruded steel part. The use of plastic for the sliding sleeve has likewise proved to be very inexpensive. The weight of the pneumatic brake cylinder has also been able to be reduced by the use of this control sleeve.

At its free end, the coupling ring has an oblique internal toothing system which can be brought into engagement with the external toothing system of the adjusting nut. The production of the coupling ring as an extruded steel part makes the inexpensive production of a very fine and precise toothing system possible. The plastic of the sliding sleeve has a pronounced damping action during the absorption of the torque which is applied by the adjusting nut via the internal toothing system. As a result, the wear of the toothing system is reduced in comparison with the control sleeve made from a continuous casting, despite the higher degree of fineness. A centering action which ensures the engagement of the two toothing systems over as full a surface area as possible also results again in the case of the engagement of the oblique internal toothing system of the control sleeve into the oblique external toothing system of the adjusting nut.

It should be noted, that the disclosed embodiments may have been described above and below with respect to different subject-matter. In particular, some embodiments may be described with reference to apparatus components, whereas those or other embodiments have been described with reference to methodologies. However, a person skilled in the art will gather from the above and the following description that, unless notified otherwise, in addition to any combination features belonging to one type of subject-matter also any combination between features relating to different subject-matter, in particular between features of apparatuses and features of methodologies, is considered to be disclosed with this application.

The fastenings 21 for a brake caliper are situated firstly on the yoke 20 and secondly on the housing 19 which is assembled from a cylinder 19a and a cover 19b. In order to actuate the brake, the brake caliper (not shown here) has to be pressed apart; this means that the spacing between the yoke 20 and the housing 19 has to be increased.

The piston 1 is provided in the housing 19. The pressure space 17 is formed by the piston 1 and the cylinder 19a of the housing 19. The compressed air connection, via which compressed air is fed to the pressure space 17, cannot be seen in this illustration. The piston tube 23 is actuated by the piston 1. However, the piston 1 is not connected fixedly to the piston tube 23, but rather is inserted loosely into the brake cylinder. The actuation of the piston tube 23 takes place merely via an annular bearing face of conical configuration, with which the piston 1 presses onto a spring collar 11 which is screwed to the piston tube 23.

Slots 27 (see FIG. 6) are provided in the piston tube 23, through which slots 27 sliding blocks 8 extend which are screwed to the housing 19. This measure prevents rotation of the piston tube 23 with respect to the housing 19, but in contrast permits a longitudinal displacement of the piston tube 23. In the case of the longitudinal displacement, the piston tube 23 is supported by the annular sliding bands 16 on the inner wall of the housing 19. The piston 1 and the piston tube 23 are held in their rest position by the piston return spring 12 which is supported on the cover 19a of the housing 19 and the spring collar 11 of the piston tube 23.

The spindle 24 is situated in the piston tube 23. The position of the spindle 24 is controlled by the adjusting nut 25. The adjusting nut 25 and spindle 24 are connected to one another via a thread which is not self-locking, with the result that a force in the direction of the longitudinal axis of the spindle 24 exerts a torque on the adjusting nut 25. This force is exerted on the spindle 24 by the conical spring 28 which is supported on the yoke 20 and the piston tube 23. The conical spring 28 therefore exerts a force which attempts to pull the spindle 24 out of the piston tube 23.

A control sleeve 3 is provided in the piston tube 23. The control sleeve 3 is constructed as a composite part, a coupling ring 6 (see FIG. 5) having been connected to a sliding sleeve 4. The coupling ring 6 is configured as an extruded steel part.

The free end side of the coupling ring 6 is provided with an oblique internal toothing system 7. Two sliding channels 5 which lie opposite one another are machined into the sliding sleeve 4. The sliding blocks 8 engage into the sliding channels 5. The width of the sliding blocks 8 is adapted exactly to the width of the sliding channels 5, with the result that no rotational movement of the control sleeve 3 is possible if the sliding blocks 8 are fixed. In order for it to be possible to fix the sliding blocks 8, fastening holes 9 (see FIG. 4) are provided which serve to receive screws. The longitudinal extent of the sliding channels 5 is dimensioned in such a way that the setting stroke 10 (see FIG. 6) remains during engagement of the sliding blocks 8. The significance of the setting stroke 10 will be explained in greater detail further below during the functional description of the brake cylinder.

Figure 2:
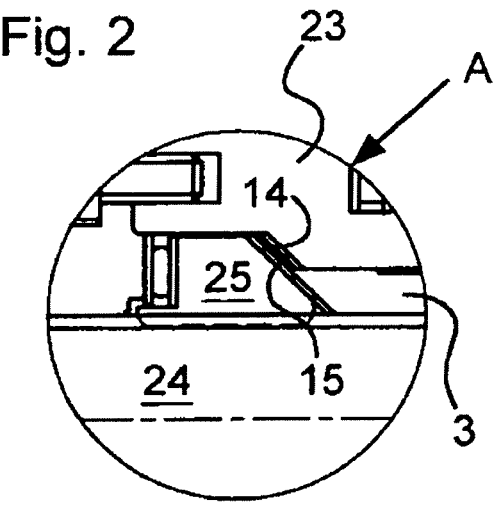
FIGS. 2 and 3 show detail illustrations of the brake cylinder which is shown in FIG. 1.
Figure 3:
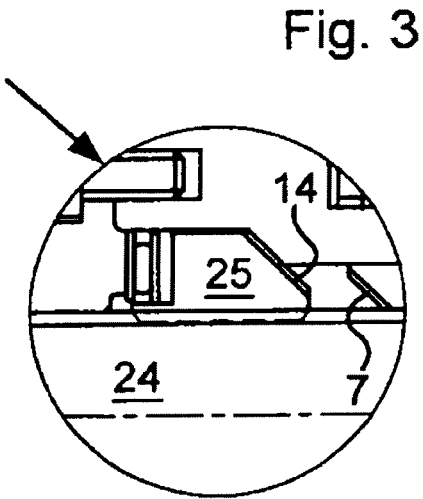

On its oblique end side, the adjusting nut 25 has an external toothing system 14 (see, in particular, FIGS. 2 and 3 which illustrate the part denoted by A in FIG. 1 on an enlarged scale and in different working states). The internal toothing system 7 of the control sleeve 3 is in engagement with the external toothing system 14 of the adjusting nut 25 in the release position of the brake. The control sleeve 3 is prevented from rotating via the sliding blocks 8 which are screwed to the housing 19. As a result of the engagement of the internal toothing system 7 of the control sleeve 3 with the external toothing system 14 of the adjusting nut 25, the latter is likewise prevented from rotating. The control sleeve 3 is prestressed via the locking spring 13 which is supported on the control sleeve 3 and on the piston tube 23. A toothed ring which is connected to the spindle 24 is pressed into a toothing system of the yoke 20 with the aid of the disk spring 26, with the result that rotation of the spindle 24 with respect to the yoke 20 is prevented.

Figure 4:
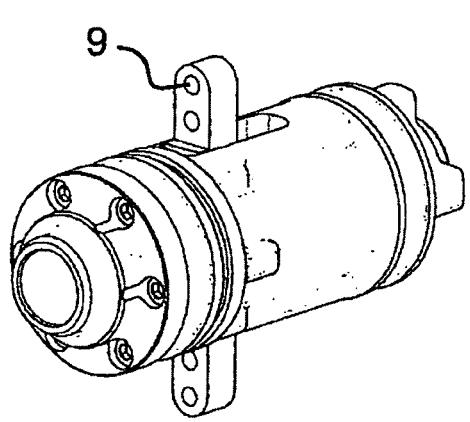
FIG. 4 shows a view of a closed piston tube with inserted sliding blocks.
Figure 5:
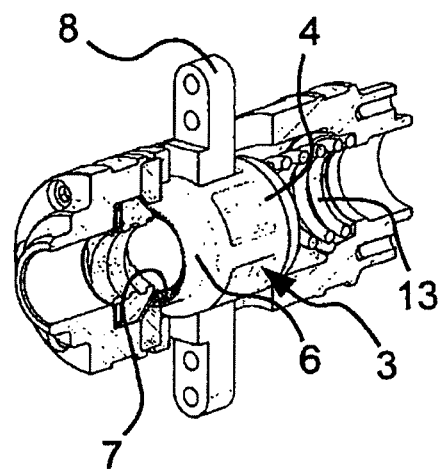
FIG. 5 shows the illustration from FIG. 4, in which the piston tube, the adjusting nut and the piston return spring have been sectioned.
Figure 6:
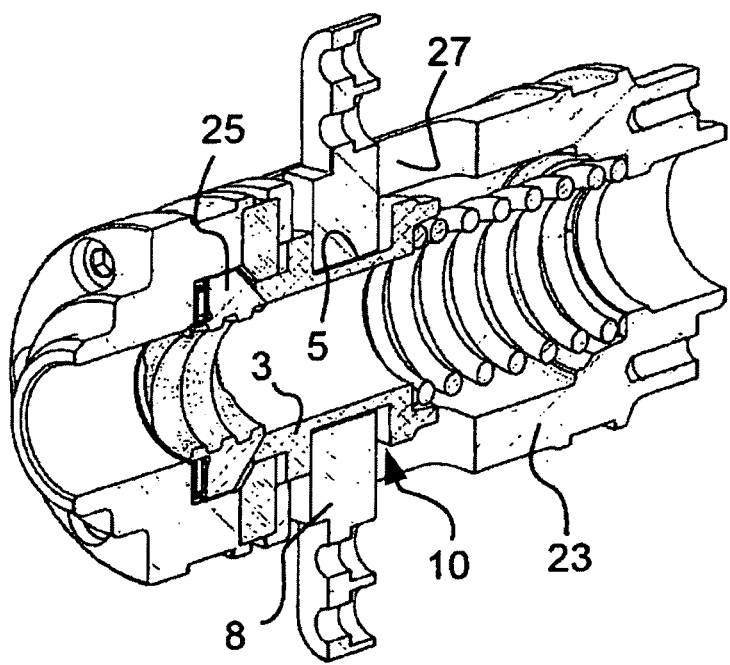
FIG. 6 shows a section through the illustration from FIG. 4.

FIGS. 4 to 6 show a premounted adjusting unit. The adjusting unit substantially comprises the piston tube 23, the adjusting nut 25, the control sleeve 3 and the locking spring 13. The loosely inserted sliding blocks 8 (likewise shown) do not belong to the premounted adjusting unit and are inserted into the brake cylinder only after the mounting of the adjusting unit.

When the housing 19 is open, the completely premounted adjusting unit is introduced into the cover 19b. The sliding blocks 8 are inserted through the slots 27 of the piston tube 23 into the sliding channels 5 of the control sleeve 3 and are fastened to the cover 19b with the aid of screws only when the adjusting unit is situated in the correct position. The piston return spring 12 can then be pushed over a guide on the cover 19b, the spring collar 11 can be screwed to the piston tube 23, the piston 1 can be inserted and the cylinder 19a can be attached. An assembly having the spindle 24 and the yoke 20 is subsequently screwed into the adjusting unit and a folding bellows 29 which is already mounted on the yoke 20 is fastened to the cover 19b.

In the following text, the function of the brake cylinder 18 is to be described:

The piston 1 is pressed to the left by an increase of the pneumatic pressure in the pressure space 17. Here, it actuates the piston tube 23 and likewise presses it to the left, counter to the force of the piston return spring 12. The control sleeve 3 which is prestressed by the locking spring 13 is pressed with its internal toothing system 7 onto the external toothing system 14 of the adjusting nut 25 and likewise moves to the left together with the piston tube 23, spindle 24, adjusting nut 25 and yoke 20. In contrast, the piston tube toothing system 15 is not in engagement with the external toothing system 14 of the adjusting nut 25. This state is shown in FIG. 2. In this state, a torque is exerted on the adjusting nut 25 by the spindle 24.

This torque is transmitted to the control sleeve 3 and from there to the housing 19 via the sliding blocks 8.

At the moment, at which the control sleeve 3 has been displaced so far to the left that the setting stroke 10 between the sliding blocks 8 and the boundary of the sliding channels closes, the brake linings (not shown here) come into contact with the brake disk. From this point in time, a counterpressure is built up via the yoke 20. Since the setting stroke 10 has now closed, the control sleeve 3 can no longer participate in a further movement of the piston tube 23.

The piston tube 23 is then displaced further to the left by a small amount, counter to the force of the conical spring 28, while the yoke 20, spindle 24 and adjusting nut 25 remain at the same location. As a result of this displacement of the piston tube 23 with respect to the adjusting nut 25, the external toothing system 14 of the adjusting nut 25 comes out of engagement with the internal toothing system 7 of the control sleeve 3. At the same time, however, the external toothing system 14 comes into engagement with the piston tube toothing system 15.

In the case of a further build up of pressure in the pressure space 17, the brake linings are pressed against the brake disk, the piston tube 23 being pressed with great force against the adjusting nut 25. As a result of these forces which are directed counter to one another of the piston 1 and piston tube 23 on one side and of the yoke 20, spindle 24 and adjusting nut 25 on the other side, a torque is exerted on the adjusting nut 25. This torque is absorbed by the piston tube toothing system 15 and transmitted to the piston tube 23. The torque is transmitted from the slots 27 in the piston tube 23 to the sliding blocks 8. The torque passes to the housing 19 via the sliding blocks 8. The housing 19 is connected to the brake caliper via the fastenings 21 in such a way that the torque is finally absorbed here. This state of the piston tube 23, adjusting nut 25 and control sleeve 3 is shown in FIG. 3.

When the brake is released, the piston tube toothing system 15 is also released again from the external toothing system 14 of the adjusting nut 25. At the same time, the external toothing system 14 of the adjusting nut 25 comes into engagement again with the internal toothing system 7 of the control sleeve 3.

Whereas no rotation of the adjusting nut 25 is permitted during a normal braking operation, the adjusting nut 25 has to be able to rotate when an adjustment becomes necessary on account of wear of the brake linings and/or brake disk. If a certain amount of wear of the brake linings has taken place, the gap between the brake linings and the brake disk has also increased. As a result, a greater piston stroke is necessary, in order to bring the brake linings into contact with the brake disk again.

The braking process is initiated as in the case of a normal braking operation. The piston 1, piston tube 23 and control sleeve 3 move together to the left. The control sleeve 3 participates in this movement until the setting stroke 10 is closed. The internal toothing system 7 of the control sleeve 3 is then decoupled from the external toothing system 14 of the adjusting nut 25. In contrast with a normal braking process, however, no counterpressure is then built up, since the brake linings are not yet in contact with the brake disk. As a result, the piston tube toothing system 15 does not yet couple into the external toothing system 14 of the adjusting nut 25. A force is exerted via the conical spring 28 on the yoke 20 and spindle 24, which force attempts to pull the spindle 24 to the left out of the piston tube 23. Here, a torque acts on the adjusting nut 25. Since, in this state, the external toothing system 14 of the adjusting nut 25 is coupled neither to the internal toothing system 7 of the control sleeve 3 nor to the piston tube toothing system 15, the adjusting nut 25 can yield to the torque and rotates on the spindle 24. As a result of this rotation of the adjusting nut 25, the spindle 24 can be pulled out to the left relative to the adjusting nut 25.

The rotation of the adjusting nut 25 continues until the brake linings have come into contact with the brake disk. At this moment, a counterpressure is built up again which brings about coupling of the piston tube toothing system 15 to the external toothing system 14 of the adjusting nut 25. The torque which acts on the adjusting nut 25 is then introduced again via the piston tube 23 directly into the sliding blocks 8 which are connected fixedly to the housing 19. The adjusting operation is therefore finished and further braking processes take place again without adjustment until a certain amount of wear of the brake linings has occurred once again.

If an adjustment is no longer possible, the brake linings have to be changed. Here, the brake cylinder 18 also has to be reset into its original state again. To this end, force is applied to the return hexagon 22 and the spindle 24 is turned completely into the piston tube 23 again. During the first braking process, after the mounting of the new brake linings, an adjustment takes place again, with the result that here too the predefined spacing between the brake linings and the brake disk is automatically set correctly.

LIST OF DESIGNATIONS

1 Piston
2 Sealing ring
3 Control sleeve
4 Sliding sleeve
5 Sliding channel
6 Coupling ring
7 Internal toothing system
8 Sliding block
9 Fastening hole
10 Setting stroke
11 Spring collar
12 Piston return spring
13 Locking spring
14 External toothing system of the adjusting nut
15 Piston tube toothing system
16 Sliding band
17 Pressure space
18 Brake cylinder
19 Housing
19*a* Cylinder
19*b* Cover
20 Yoke
21 Fastening for brake caliper
22 Return hexagon
23 Piston tube
24 Spindle
25 Adjusting nut
26 Disk spring
27 Slot
28 Conical spring
29 Folding bellows

The invention claimed is:

1. A pneumatic brake cylinder comprising:
a housing;
a piston which can be moved in the housing to transmit pneumatic pressure to a brake; and
a device for automatic adjustment for wear of brake linings, the device including a spindle, an adjusting nut and a piston tube which can be brought into engagement with the adjusting nut,
wherein a torque applied by the adjusting nut to the piston tube is introduced by the piston tube directly into elements which are connected fixedly to the housing,
wherein the elements connected fixedly to the housing are configured as sliding blocks which slide in slots of the piston tube,
wherein orientation of the housing and the device for automatic adjustment are configured such that the device for automatic adjustment is mounted to the housing prior to insertion of the elements fixedly connected to the housing into the brake cylinder housing, and
wherein a control sleeve is arranged in the piston tube, the control sleeve being a composite part with a sliding sleeve made from plastic and an injection molded coupling ring made from metal, and wherein, at a free end, the injection molded coupling ring has an oblique internal toothing system which is configured to engage an external toothing system of the adjusting nut.

2. The pneumatic brake cylinder of claim 1, wherein the piston is positioned loosely inside the brake cylinder and has no fixed connection to the piston tube.

3. The pneumatic brake cylinder of claim 2, wherein the piston is produced as a deep drawn part made from steel.

4. The pneumatic brake cylinder of claim 3, wherein a sealing ring is vulcanized onto the edge of the piston.

5. The pneumatic brake cylinder of claim 1, wherein the external toothing system is disposed on one end side of the adjusting nut.

6. The pneumatic brake cylinder of claim 5, wherein the piston tube is brought into engagement via a piston tube toothing system with the external toothing system of the adjusting nut.

7. The pneumatic brake cylinder of claim 1, wherein the sliding blocks engage with a free end into sliding channels of the control sleeve.

8. The pneumatic brake cylinder of claim 7, wherein the sliding channels are dimensioned in such a way that they act as a stop for the sliding blocks and restrict an axial movement of the control sleeve.

* * * * *